United States Patent
Vijayaraghavan et al.

(10) Patent No.: US 11,921,573 B2
(45) Date of Patent: Mar. 5, 2024

(54) SYSTEMS AND METHODS FOR PREDICTIVE SYSTEM FAILURE MONITORING

(71) Applicant: Accenture Inc., Chicago, IL (US)

(72) Inventors: Badrinarayanan Damal Vijayaraghavan, Bengaluru (IN); Atul Goel, Dharamsala (IN); Harshith Vuppala, Bangalore (IN); Rani Gopalakrishnan, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 462 days.

(21) Appl. No.: 16/700,316

(22) Filed: Dec. 2, 2019

(65) Prior Publication Data
US 2021/0165708 A1   Jun. 3, 2021

(51) Int. Cl.
 *G06F 11/00* (2006.01)
 *G06F 11/07* (2006.01)
 (Continued)

(52) U.S. Cl.
 CPC ...... *G06F 11/0793* (2013.01); *G06F 11/0703* (2013.01); *G06F 11/0709* (2013.01);
 (Continued)

(58) Field of Classification Search
 CPC .............. G06F 11/008; G06F 11/0703; G06F 11/0709; G06F 11/0751; G06F 11/0754;
 (Continued)

(56) References Cited

U.S. PATENT DOCUMENTS 10,366,346 B2 * 7/2019 Achin .................... G06N 20/00
10,984,338 B2 * 4/2021 Morris, II .............. G06N 20/00
(Continued)

OTHER PUBLICATIONS

Zhou, Qifeng, Ruyuan Han, Tao Li, and Bin Xia. "Joint prediction of time series data in inventory management." Knowledge and Information Systems 61 (2019): pp. 905-929. (Year: 2019).*
(Continued)

*Primary Examiner* — Anthony J Amoroso
(74) *Attorney, Agent, or Firm* — Norton Rose Fulbright US LLP (57) ABSTRACT

Systems, methods, and computer-readable storage media configured to predict future system failures are disclosed. Performance metrics (e.g., key performance indicators (KPIs)) of a system may be monitored and machine learning techniques may utilize a trained model to evaluate the performance metrics and identify trends in the performance metrics indicative of future failures of the monitored system. The predicted future failures may be identified based on combinations of different performance metrics and the impact that the performance metric trends of the group of different performance metrics will have on the system in the future. Upon predicting that a system failure will occur, operations to mitigate the failure may be initiated. The disclosed embodiments may improve overall performance of monitored systems by: increasing system uptimes (i.e., availability); helping systems administrators maintain the monitored systems in a healthy state; and ensuring the functionality those systems provide is readily available to system users.

20 Claims, 4 Drawing Sheets

(51) Int. Cl.
*G06N 3/04* (2023.01)
*G06N 3/08* (2023.01)
*G06N 5/01* (2023.01)
*G06N 5/04* (2023.01)
*G06N 20/20* (2019.01)

(52) U.S. Cl.
CPC ...... *G06F 11/0751* (2013.01); *G06F 11/0754* (2013.01); *G06N 3/04* (2013.01); *G06N 3/08* (2013.01); *G06N 5/01* (2023.01); *G06N 5/04* (2013.01); *G06N 20/20* (2019.01); *G06F 2201/81* (2013.01)

(58) Field of Classification Search
CPC ............. G06F 11/0766; G06F 11/0793; G06F 11/1476; G06F 11/324; G06F 11/327; G06F 11/328; G06F 11/34; G06F 11/3447; G06F 11/3452; G06F 2201/81; G06N 3/04; G06N 3/08; G06N 5/003; G06N 5/04; G06N 20/20
See application file for complete search history.

(56) References Cited

U.S. PATENT DOCUMENTS

| | | | | |
|---|---|---|---|---|
| 2016/0155315 | A1* | 6/2016 | McElhinney | G06F 11/008 340/502 |
| 2017/0329660 | A1* | 11/2017 | Salunke | G06F 11/3409 |
| 2019/0379589 | A1* | 12/2019 | Ryan | G06F 17/142 |
| 2020/0174774 | A1* | 6/2020 | Natarajan | G06N 20/00 |

OTHER PUBLICATIONS

Pal, Gautam, Gangmin Li, and Katie Atkinson. "Big data real time ingestion and machine learning." In 2018 IEEE Second International Conference on Data Stream Mining & Processing (DSMP), pp. 25-31. IEEE, 2018. (Year: 2018).*

"Sliding Window Method and Exponential Weighting Method," Web page < https://www.mathworks.com/help/dsp/ug/sliding-window-method-and-exponential-weighting-method.html >, 6 pages, Sep. 26, 2017, retrieved from Internet Archive Wayback Machine on Mar. 20, 2023. (Year: 2017).*

* cited by examiner

SYSTEMS AND METHODS FOR PREDICTIVE SYSTEM FAILURE MONITORING

TECHNICAL FIELD

The present disclosure generally relates to system health monitoring and more specifically to systems and methods for utilizing machine learning techniques to predict and mitigate system failures and degradation of system services.

BACKGROUND

Health monitoring tools are widely used to evaluate the performance and operations of computing systems and the services they provide. Such tools collect data regarding a system, such as memory and processor utilization or other metrics, and then output the results to a user (e.g., a member of an information technology (IT) department, etc.). The outputs of the health monitoring tools may be analyzed by the user to identify anomalies in system performance, such as system or service failures, and upon detection of such anomalies the user may make modifications to try and remediate the impact that the identified anomalies have on the system and system performance.

While health monitoring tools have proved useful for detecting issues with system performance, such tools suffer from many drawbacks. One of the primary drawbacks of existing health monitoring tools is that they are reactionary. To illustrate, while such tools may be capable of providing information to a user for analysis in order to identify an issue with a system or a service that needs remediation, such operations do not operate to prevent the identified issue from occurring in the first place (i.e., the tools are not capable of predicting the occurrence of an issue to allow remediation before the issue actually occurs). The inability to predict the occurrence of issues for a system in advance has a negative impact on overall system performance and may prevent users from accessing services and functionality that the system provides. For example, due to the reactionary nature of existing techniques, when a failure occurs, the system must be taken offline for anywhere from 30 minutes to 4 hours or more to resolve the issue that caused the failure.

SUMMARY

The present application is directed to systems, methods, and computer-readable storage media configured to predict future system failures using machine learning techniques. Performance metrics (e.g., key performance indicators (KPIs)) of a system may be monitored and compiled into datasets. The datasets may be used as inputs to a machine learning engine that executes a trained model against information included in the datasets to identify trends in the performance metrics indicative of future failures of the monitored system. The predicted failures may be identified by the machine learning engine based on a group of different performance metrics, rather than on any single performance metric in isolation. For example, while each performance metric may have some impact on the overall performance of the system, embodiments may analyze trends associated with a group of performance metrics to understand how the combined impact of the group of performance metrics will impact system performance at some time in the future. For example, multiple performance metrics may not individually signal a system failure is imminent, but when multiple performance metrics are trending in a negative manner, the combined impact caused by the negative trends of the performance metrics may lead to a system failure if remedial actions are not taken. It is noted that some systems include performance metrics-based system monitoring-however, such monitoring capabilities do not facilitate predictions that failures are likely to occur and do not analyze the aggregate or combined impact that monitored performance metrics may have on the system.

Upon identifying a predicted system failure, operations of embodiments may perform operations to mitigate the potential failure before it actually occurs. For example, a user interface may be presented that provides interactive tools that enable a user (e.g., a system administrator, etc.) to initiate operations to mitigate the predicted failure, such as to free up resources of the system or other operations. In some aspects, failure mitigation processes may be automatically initiated upon detection of the predicted failure, which may enable more rapid recovery of system stability (as opposed to having to wait for user interaction with the interactive user interface). The disclosed embodiments may improve overall performance of monitored systems. To illustrate, the concepts disclosed herein may increase system uptimes and availability, ensuring that the functionality and services the system provides are reliably provided to system users. Additionally, the interactive tools may help systems administrators maintain the monitored systems in a healthy state and prevent the system from experiencing degraded performance and unexpected failures.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed methods and apparatuses, reference should be made to the embodiments illustrated in greater detail in the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

In the disclosure that follows, aspects of an approach for predictively identifying system failures using machine learning techniques are described. The disclosed techniques enable system failures to be identified based on trends in different performance metrics. While a single performance metric and associated trend may not individually signal an approaching system failure, the disclosed embodiments analyze how multiple performance metrics and associated trends may interact to impact system performance and predict future system failures. As will become apparent below, failure mitigation processes according to the present disclosure enable manual and automated failure mitigation processes to be performed before system failures actually occur, thereby ensuring system stability without the disadvantages associated with system failures (e.g., loss of access to system functionality, system services, and the like). The predictive nature of the disclosed embodiments improves overall performance of monitored systems by increasing system uptimes and availability, ensuring that the functionality and services the system provides are reliably provided to system users, and minimizing the occurrence of system failures.

Figure 1:
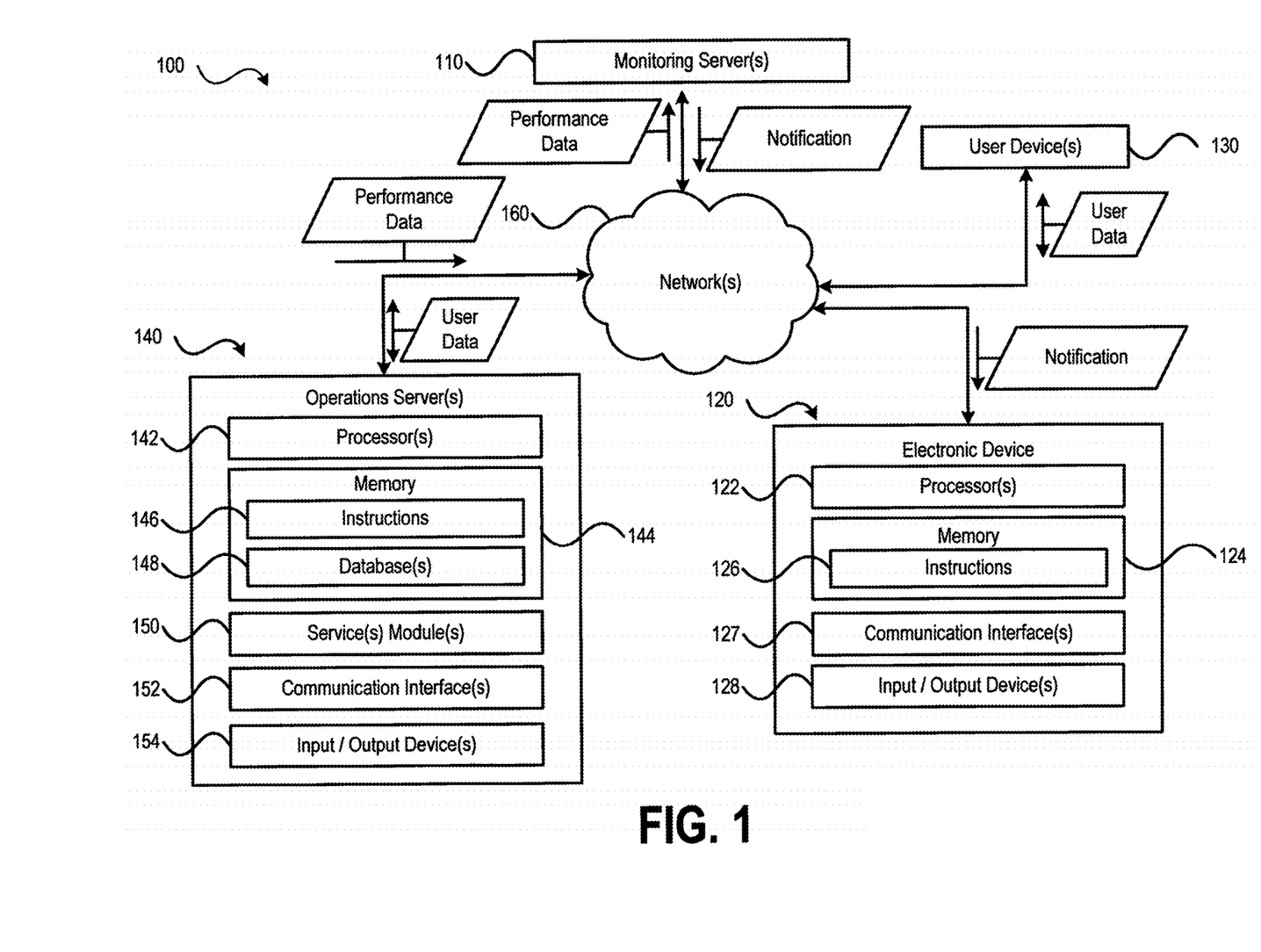
FIG. 1 is a block diagram of an exemplary system for performing predictive system health monitoring in accordance with aspects of the present disclosure.

Referring to FIG. 1, a block diagram of an exemplary system for performing predictive system health monitoring in accordance with aspects of the present disclosure is shown as a system 100. As shown in FIG. 1, the system 100 includes a monitoring server 110, an electronic device 120, one or more user devices 130, and one or more operations servers 140, each of which is described in more detail below. The monitoring server 110, the electronic device 120, the user device 130, and the one or more operations servers 140 may be communicatively coupled to one or more networks 160 via one or more wired or wireless communication links.

The one or more networks 160 may include local area networks (LANs), wide area networks (WANs), wireless LANs (WLANs), wireless WANs, metropolitan area networks (MANs), cellular data networks, cellular voice networks, the Internet, and the like. The communication links provided via the one or more networks may include wired or wireless communication links established according to one or more communication protocols or standards (e.g., an Ethernet protocol, a transmission control protocol/internet protocol (TCP/IP), an institute of electrical and electronics engineers (IEEE) 802.11 protocol, and an IEEE 802.16 protocol, a $3^{rd}$ Generation (3G) communication standard, a $4^{th}$ Generation (4G)/long term evolution (LTE) communication standard, a $5^{th}$ Generation (5G) communication standard, and the like).

The electronic device 120 may be a laptop computing device, a smartphone, a tablet computing device, a desktop computing device, a personal digital assistant, or other computing device provided to an information technology specialist or other individual that is tasked with maintaining the operations server 140 in a healthy operating state, such as to ensure availability of computational, storage, and network communication resources of the operations server 140. It is noted that although FIG. 1 illustrates a single electronic device 120, embodiments of the system 100 according to the present disclosure may include more than one electronic device 120. The electronic device 120 includes one or more processors 122, a memory 124, one or more communication interfaces 127, and input/output (I/O) devices 128. Each of the one or more processors 122 may be a central processing unit (CPU) or other computing circuitry (e.g., a microcontroller, one or more application specific integrated circuits (ASICs), and the like) and may have one or more processing cores. The memory 124 may include read only memory (ROM) devices, random access memory (RAM) devices, one or more hard disk drives (HDDs), flash memory devices, solid state drives (SSDs), other devices configured to store data in a persistent or non-persistent state, or a combination of different memory devices. The memory 124 may store instructions 126 that, when executed by the one or more processors 122, cause the one or more processors 122 to perform the operations described in connection with the electronic device 120 with reference to FIGS. 1-5. The one or more communication interfaces 127 may be configured to communicatively couple the electronic device 120 to the one or more networks 160 via wired or wireless communication links according to one or more communication protocols or standards (e.g., the one or more communication standards described above with reference to the one or more networks 160). The I/O devices 128 may include one or more display devices, a keyboard, a stylus, one or more touchscreens, a mouse, a trackpad, a camera, one or more speakers, haptic feedback devices, or other types of devices that enable a user to receive information from or provide information to the electronic device 120.

The operations server 140 includes one or more processors 142, a memory 144, one or more services modules 150, one or more communication interfaces 152, and one or more I/O devices 154. The one or more processors 122 may be CPUs or other computing circuitry (e.g., microcontrollers, ASICs, and the like) and each of the one or more processors 122 may have one or more processing cores. The memory 144 may include ROM devices, RAM devices, one or more HDDs, flash memory devices, SSDs, other devices configured to store data in a persistent or non-persistent state, or a combination of different memory devices. The memory 144 may store instructions 146 that, when executed by the one or more processors 142, cause the one or more processors 142 to perform the operations described in connection with the operations server 140 with reference to FIGS. 1-5. Additionally, one or more databases 148 may be stored at the memory 144. The one or more databases 148 may be configured to store user data and other information in support of the operations and functionality provided by the operations server 140, as described in more detail below. In an aspect, the one or more databases 148 may be stored in local memory of the operations server 140, such as at the one or more HDDs, the one or more SSDs, etc. In an additional or alternative aspect, the one or more databases 148 may be stored in memory 144 external to the operations server 140, such as at one or more network attached storage (NAS) devices or alternatively the system 100 may include one or more database servers (not shown in FIG. 1 for simplicity of the drawing) communicatively coupled (e.g., via the one or more networks 160) to the operations server 140. Additional aspects of the one or more database 148 are described in more detail below. The one or more communication interfaces 152 may be configured to communicatively couple the operations server 140 to the one or more networks 160 via wired or wireless communication links according to one or more communication protocols or standards (e.g., the one or more communication standards described above with reference to the one or more networks 160). The/O devices 154 may include one or more display devices, a keyboard, a stylus, one or more touchscreens, a mouse, a trackpad, a camera, one or more speakers, haptic feedback devices, or other types of devices that enable a user to interact with the operations server 140.

The one or more services modules 150 may be configured to facilitate various operations of the operations server 140, such as to facilitate interaction and data transfer between the user devices 130. For example, the one or more service modules 150 may include a database service module configured to handle requests received from the user devices 130 to read information from and/or write information to the one or more databases 148. The database service module may be configured to process the requests from the user device 130, such as to queue the requests and process them in a first-in, first-out (FIFO) manner, a last-in, first-out (LIFO) manner according, or other more complex database access request processing schemes (e.g., request prioritization schemes, etc.). As another example, the one or more service modules 150 may include one or more applications that provide services to the one or more user devices, such as accounting programs, cloud-based and/or web-based applications, media streaming services, backup services, and the like, each of which provides services to users operating the one or more user devices 130 or to support the functionality provided by the operations server 140 (e.g., backup services, etc.). It is noted that the exemplary service modules described herein have been provided for purposes of illustration, rather than by way of limitation and the other service modules providing additional services and functionality may be provided by the operations server 140.

The one or more user devices 130 may include laptop computing devices, desktop computing devices, web servers, mobile communication devices (e.g., smartphones, PDAs, cellular phones, tablet computing devices, and the like). The one or more user devices 130 may be operated by users to access the services and functionality provided by the services modules 150 (described above) via the one or more networks 160. For example, a user may operate a particular user device of the one or more user devices 130 to access an application or service provided by the one or more service modules 150 via the one or more networks 160.

Over time, an operational status or state of the operations server 140 may change as computing resources of the operations server 140 (e.g., processing capacity of the one or more processors 142, utilization and availability of the memory 144, bandwidth available via the one or more networks 160, and the like) are allocated, de-allocated or re-allocated, etc. Additionally, the performance of the operations server 140 may be impacted by one or more other types of failures that may occur over time (e.g., failure of one or more HDDs, network outages, etc.). The monitoring server 110 may be configured to monitor the operations server 140 and generate metrics associated with performance of the operations server 140. Additionally, the monitoring server 110 may be configured to apply machine learning techniques to the metrics associated with the performance of the operations server 140 to predictively identify potential performance issues that may impact the quality of service provided by the operations server 140, such as predict the failure or degraded performance with respect to a service provided by the one or more service modules 150.

Figure 2:
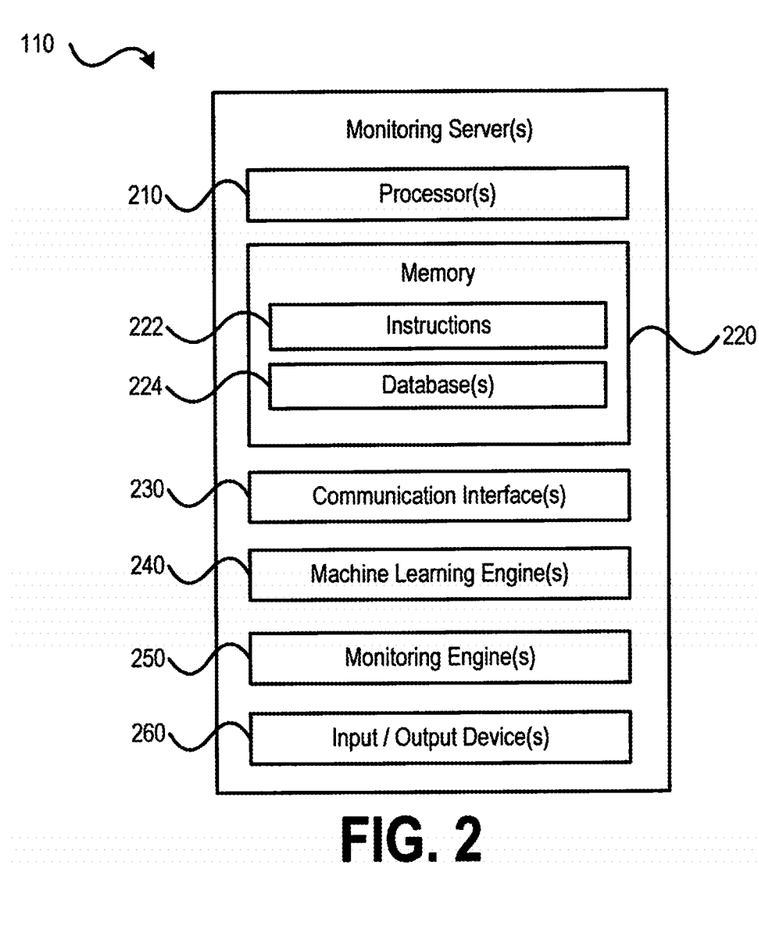
FIG. 2 is a block diagram illustrating aspects of a monitoring server configured in accordance with embodiments of the present disclosure.

Referring to FIG. 2, a block diagram illustrating aspects of a monitoring server (e.g., the monitoring server 110 of FIG. 1) configured in accordance with embodiments of the present disclosure is shown. As shown in FIG. 2, the monitoring server 110 may include one or more processors 210, a memory 220, one or more communication interfaces 230, one or more machine learning engines 240, one or more monitoring engines 250, and one or more I/O devices 260. Each of the one or more processors 210 may be a CPU having one or more processing cores or other computing circuitry (e.g., a microcontroller, one or more ASICs, and the like). The memory 220 may include ROM devices, RAM devices, one or more HDDs, flash memory devices, solid state drives (SSDs), other devices configured to store data in a persistent or non-persistent state, or a combination of different memory devices. The memory 220 may store instructions 222 that, when executed by the one or more processors 210, cause the one or more processors 210 to perform the operations described in connection with the monitoring server 110 with reference to FIGS. 1-5. The one or more communication interfaces 230 may be configured to communicatively couple the monitoring server 110 to one or more networks (e.g., the one or more networks 160 of FIG. 1) via wired or wireless communication links according to one or more communication protocols or standards (e.g., the one or more communication standards described above with reference to the one or more networks 160 of FIG. 1). The I/O devices 260 may include one or more display devices, a keyboard, a stylus, one or more touchscreens, a mouse, a trackpad, a camera, one or more speakers, haptic feedback devices, or other types of devices that enable a user to receive information from or provide information to the monitoring server 110.

The one or more monitoring engines 250 may be configured to monitor performance of one or more devices of a system, such as the system 100 of FIG. 1, as well as other operational attributes of the monitored system in real-time. In an aspect, each of the one or more monitoring servers 110 that may be embodied has a set of instructions (e.g., the instructions 222) that, when executed by the one or more processors 210, cause the one or more processors 210 to perform the operations described herein with reference to the one or more monitoring engines 250. In addition to software implementations, the one or more monitoring engines 250 may be implemented via hardware, such as via one or more processors, ASICs, or other circuitry configured to perform the operations described herein with reference to the one or more monitoring engines 250. During the monitoring, the one or more monitoring engines 250 may be configured to collect data corresponding to the operational attributes of the monitored system and the collected data may include information associated with memory utilization (e.g., information associated with RAM utilization, HDD utilization, SSD utilization, cache memory utilization, etc.), log usage, active processes (e.g., work processes being executed via one or more processors to service user requests or other functionality of the monitored system, etc.), database updates (e.g., a number of read and/or write requests associated with one or more databases, etc.), system updates (e.g., a number of updates to existing or pending work processes, etc.), response time information (e.g., information regarding an amount of time for processing or initiating processing of user requests, an amount of time for retrieving information from the one or more databases, an amount of time for writing information to the one or more databases, an amount of time to access resources of the system via one or more networks, etc.). It is noted that the exemplary attributes described above have been provided for purposes of illustration, rather than by way of limitation, and the monitoring engine 250 of embodiments may be configured to monitor a subset of the attributes identified above or other attributes providing meaningful information for analysis, as described in more detail below. Additionally, it is noted that the collected information may be compiled and recorded as records within one or more databases 224 stored at the memory 220.

As the information for the monitored system is compiled and recorded, the information may be formatted according to one or more data types. For example, portions of the collected data may be stored as records (e.g., in a database) using various data types. Exemplary data types that may be used include: a numeric type (e.g., data having integer values), a decimal type (e.g., data comprising numbers with one or more values following a decimal point, such as may be used to represent percentages), a binary type (e.g., data that may have one of two values, such as Y/N, 0/1, etc.), a date-time type (e.g., data representing a date and/or a time, such as for providing one or more timestamps), a string type (e.g., a collection of alpha-numeric characters and symbols), or other data types. It is noted that the exemplary data types described above have been provided for purposes of illustration, rather than by way of limitation and the other data types may also be used to record the information compiled by the one or more monitoring engines 250 in accordance with aspects of the present disclosure.

Exemplary pieces of information associated with system performance that may be compiled by the one or more monitoring engines 250 and recorded as records in one or more databases are illustrated in Table 1 and described below.

SM12 indicates a high number of lock entries are present in the system, this may indicate that the one or more lock object (e.g., typically older lock objects) are not being released on a specific table. As the number of lock entries increases, the likelihood that a deadlock situation occurs in the system also increases because other processes accessing the same table are waiting for the (earlier) lock entry to be released. When a deadlock situation occurs, the performance of the system is negatively impacted and may lead to a system failure in some circumstances.

The variable TLOGS represents a transaction log. A database (e.g., a DB2 database) may write (or log) transactions to transaction log files while the transactions are still in progress. Every logged action may be written to a log buffer and the log buffer may be written out to disk whenever it becomes full or a transaction is committed. If writing the log buffer to disk results in a disk utilization of more than 25%, the system may become negatively impacted because a rollback would also occupy the diskspace as soon as the process utilizing most of the diskspace is canceled. Once the rollback completes, the transaction log may be cleared. It is to be appreciated that a combination of high values for SM12 and TLOGS may be more likely to indicate a probable system failure, as a high value for SM12 may indicate that there are a lot of processes waiting to access information stored in the database, which may lead to higher values for TLOGS and an increase in disk utilization, both of which would negatively impact system performance. Additionally, it is noted that even if the values for SM12 and TLOGS may individually not indicate a negative impact on system performance, taking the information represented by these two variable together in combination may indicate degrading system performance and a predicted system failure. For example, when the SM12 variable indicates the number of lock entries is increasing and the TLOGS variable indicates the amount of diskspace is increasing, this may suggest a job or process is in a hung state or is taking an unusually long time to complete. If this trend continues, the system may be predicted to fail.

TABLE 1

| Field Name | Field Description | Type | Unit | Variable |
| --- | --- | --- | --- | --- |
| Timestamp | Time Stamp of Collected Data from Managed system | Date-Time | 24 hr time format | Input |
| MEM_UTIL | Memory Utilization | Decimal | % | Input |
| SM12 | Total number of locks | Numeric | NA | Input |
| TLOGS | Transactional Log Usage | Numeric | % | Input |
| WP_BGD | Total number of Background Workprocess occupied | Numeric | NA | Input |
| WP_DIA | Total number of DIALOG Workprocess occupied | Numeric | NA | Input |
| WP_UPD | Total number of Update Workprocess occupied | Numeric | NA | Input |
| HURT | High Update Response Time | Decimal | ms | Input |
| NRIV_LOCKWAIT | Total number of lock waits on NRIV table | Decimal | NA | Input |
| UPDATE_STATUS | Status of the Update service | Binary | NA | Input |
| NRBUFFER | Number of Buffer Objects in erroneous status | Numeric | NA | Input |
| System_down | Status of the overall system | Binary | NA | Output |

The variable SM12 is a feature offered by the SAP ABAP Dictionary and represents a number lock objects, which are used to synchronize access to the same data by more than one program. Data records (e.g., in a database) may be accessed with the help of one or more programs and lock objects may be used to avoid inconsistencies when data is inserted into or changed in the database. If the variable The variable WP_BGD represents the number of processors or jobs in the system that are being run in the background (e.g., without affecting normal operations). These jobs are used to reduce manual effort and to automate certain processes, such as running reports without any user input. Background processes or jobs may be scheduled to run anytime and are. run as processes at operating system (OS)

level, which means that such background processes or jobs consume processor and memory resources. As the number of background processes increases, the amount of system resources (e.g., processor and memory resources) being utilized within the system also increases. If a large number of processes or jobs are being performed in the background, the strain that those tasks put on system resources may negatively impact the system performance.

The variable WP_DIA relates to dialog work processes, which are processes created based on interactive sessions created by end users (e.g., in the application foreground). Each Dialog work process may be allotted with specific time for executing a given command and all interactive requests (e.g., SAPGUI requests) may be processed by dialog work processes. Each dialog work process is a process at the OS level and therefore, consumes processor and memory resources. As the number of dialog workprocess being performed in the system increases, end-users may experience slowness and if too many dialog workprocess are occupied in the system, the system may enter a hung state, which may prevent end users from accessing and/or interacting with the system. As can be appreciated from the above-description, during analysis according to the concepts disclosed herein, the WP-BGD and WP_DIA variables may have values that individually do not suggest a system failure or negative system performance is imminent. However, as described herein, the combined effect associated with the values for these two variables may provide information that suggests a trend towards a system failure or negative impact on overall system performance. For example, the number of background processes and the number of dialog processes, when looked at individually, may not indicate any impact on system performance, but when the system resources (e.g., processor and memory resources) allocated or utilized by these two different types of processes are considered together, a negative impact or failure related to system performance may be identified.

The variable WP_UPD relates to the number of update workprocesses occupied by the system. The system may be configured to initiate updates in an asynchronous (e.g., not simultaneous) manner by bundling all updates for one system transaction into a single database transaction to ensure data integrity. To illustrate, end users may initiate update processes by saving data or update processes may be initiated by background processes or jobs, such as to modify, update or insert information into one or more database tables. Each update in the system occupies one update workprocess. When the number of update workprocess increases, this may indicate that there are updates stuck in the system, which may not have released a lock (e.g., a database lock associated with the SM12 variable), further increasing the number of lock entries and negatively impacting the system performance, as described above with reference to the SM12 and TLOGS variables.

The variable HURT (High Update Response Time) indicates the time taken by the system for update processes to update (or make changes) the database(s). If a recommended value is 1000 ms (i.e. 1 second) for updates to be processed, higher values for the HURT variable may indicate that one or more update processes are stuck, which significantly impacts the performance of the system, as indicated when discussing the impact on system performance indicated by the variable WP_UPD.

The variable UPDATE_STATUS indicates whether an update service is active or inactive. If the update service is inactive then the process of updates in the system are halted. The status of the update service may go to inactive status due to various reasons (e.g., the database tablespace utilization is full and/or an auto extend mode is set OFF). When the update services are inactive, this may lead to a system inconsistence state and update failures, both of which will lead to negative system performance and failures.

The variable NRIV_LOCKWAIT indicates the total number of times system applications or connections have waited for locks. At the database level, this represents the total number of times that applications have had to wait for locks within a particular database. In SAP systems, a table (e.g., an NRIV table) may be used to store number range intervals data. Number range intervals are assigned to documents for specific objects and assigned a number from an interval range maintained in a "SNRO" SAP Transaction code. When more lock waits are reflected by the NRIV table, this indicates that applications are waiting for creation of new documents and allocation of a next number range interval, which impact the system's ability to close open documents and can result in a system hung state.

The variable NRBUFFER is associated with the number range buffer and may be used to increase system performance while allocation of new number ranges. Instead of fetching the numbers each time from the database, the system may read the number ranges from the number range buffer. If the number range interval is not in the buffer or the number stock is exhausted, the number range buffer must fetch new numbers from table NRIV in the database resulting in more input outputs per second (IOPS). In some cases, the system may not be able to fetch the new number range from database and in such scenarios a buffer reset may be required. When the buffer reset is not done, end users are not able to create new documents leading to a system lock wait scenario and as explained above, such lock waits, which may be reflected in the NRIV table, may lead to system performance degradation or degraded end-user experience. As shown above, the information or performance metrics compiled by the system may enable the system to utilize machine learning techniques to identify trends based on multiple performance metrics in combination that indicate system performance and predict when system performance is likely to incur a failure (in the future), as described in more detail below. It is noted that some of the exemplary metrics described above relate to SAP systems-however, such disclosure has been provided for purposes of illustration, rather than by way of limitation and the concepts herein may readily be applied to non-SAP systems as well.

In an aspect, each of the one or more machine learning engines 240 that may be embodied has a set of instructions (e.g., the instructions 222) that, when executed by the one or more processors 210, cause the one or more processors 210 to perform the operations described herein with reference to the machine learning engines 240. In addition to software implementations, the one or more machine learning engines 240 may be implemented via hardware, such as via one or more processors, ASICs, or other circuitry configured to perform the operations described herein with reference to the one or more machine learning engines 240. Unlike traditional health monitoring systems, which are reactionary, the one or more machine learning engines 240 of the monitoring server 110 may be configured to execute one or more machine learning techniques against a set of metrics associated with the performance of the monitored system and identify potential system failures, potential degradation of services, or other issues that indicate a problem associated with the monitored system (e.g., the operations server(s) 140 of FIG. 1) are predicted to occur in the future. The metrics utilized as inputs to the one or more machine learning engines 240 may correspond to the data collected and recorded by the one or more monitoring engines 250.

To facilitate more robust analysis of the input metrics, the one or more machine learning engines 240 may be configured to evaluate multiple metrics (e.g., KPIs) and the combined effect that the multiple metrics have on system behaviors to identify patterns indicative of abnormal, degraded, and/or unstable system performance. Exemplary aspects of operations that may be performed by the one or more machine learning engines 240 to provide such functionality are described in more detail below.

Referring back to FIG. 1, during operation of the system 100, users may operate the user devices 130 to transmit/receive data (shown as user data in FIG. 1) to/from the operations server 140. For example, a user device may transmit a request to retrieve (e.g., read) information from the one or more databases 148. The request may be received at the operations server 140 via the network 160 and provided to one of the service modules 150 (e.g., a database management service module, etc.) for processing. The service module receiving the request may place the request in a queue for processing (or may process the request immediately depending on a volume of requests being processed by the operations server 140). As the request is received and processed, the monitoring server 110 may monitor the performance of the operations server 140. For example, as shown in FIG. 1, the monitoring server 110 may periodically receive performance data from the operations server 140. In an aspect, the performance data may be transmitted in response to messages transmitted from the monitoring server 110 (e.g., one of the monitoring engine 250 of FIG. 2), such as probe messages configured to request performance data regarding a particular aspect of the health and performance of the operations server 140, such as a probe requesting performance data related to memory utilization, a probe requesting performance data related to an update status of the operations server, or other metrics. In an additional or alternative aspect, the operations server 140 may be configured to periodically provide different ones of the monitored metrics to the one or more monitoring engines of the monitoring server 110. For example, the monitoring server 110 may provide information to the operations server 140 indicating the types of performance metrics being monitored by the one or more monitoring engines and scheduling information that indicates a time interval for transmitting updated performance data including information relevant to the monitored performance metrics to the monitoring server 110. Based on the scheduling information, the operations server 140 may provide the types of performance metrics requested by the monitoring server 110. In an aspect, the one or more service modules 150 of the operations server 140 may include a service module configured to collect and provide the performance metrics to the monitoring server 110. In still another additional or alternative aspect, the functionality and capabilities provided by the monitoring server 110 may be integrated within the operations server 140, such as a service module(s) configured to provide the functionality described with respect to the one or more monitoring engines and the monitoring server 110. Thus, it is to be understood that although FIG. 1 illustrates the monitoring server 110 as a separate server with respect to the operations server 140, in some aspects the capabilities and functionalities of the monitoring server 110 and the operations server 140 may be provided by a single server.

In an aspect, one or more processing operations may be performed on the performance metrics data prior to being utilized by the one or more machine learning engines to analyze system performance. As an example, the processing operations to prepare the performance metrics for use by the one or more machine learning engines may include a cleansing step. The cleansing step may be performed to "homogenize" the data (e.g., create uniformity of the data sets), which may improve the accuracy of the outputs produced by the one or more machine learning engines. For example, the cleansing process may include replacing NULL values included in the performance metrics with mean values, which may maintain consistency of the dataset. In an aspect, the mean values may be determined based on a historical dataset of performance metrics, which may be stored at one or more databases (e.g., the one or more databases 224 of FIG. 2). It is noted that NULL values may be present in the compiled data for a variety of reasons, such as when the system is not accessible or reachable due to network issues for a particular timestamped dataset. The historical dataset may be updated as new performance metrics are received and cleaned. In addition to cleaning NULL values associated with particular performance metrics, the cleaning process may include removing one or rows included in the dataset, such as removing rows of the dataset when all values for a row are NULL. For example, an exemplary aspects associated with information compiled as a dataset is illustrated below:

| SM12 | TLOGS | WP_DIA |
|------|-------|--------|
| 123  | 12    | 50     |
| 62   | 10    | NULL   |
| 350  | NULL  | 100    |

As shown in the example above, the first row may correspond to a dataset compiled at a first time (e.g., a first timestamp), the second row may correspond to a dataset compiled at a second time (e.g., a second timestamp), and the third row may correspond to a dataset compiled at a third time (e.g., a third timestamp). The first dataset does not include any NULL values, the second row includes a NULL value for the WP_DIA value, and the third dataset includes a NULL value for the TLOGS value. The first dataset may not need to be cleaned, the second dataset may be cleaned by replacing the NULL value for the WP_DIA value, and the third dataset may be cleaned by replacing the NULL value for the TLOGS value, as described above. For example, following the cleaning process, the first, second, and third datasets may be as follows:

| SM12 | TLOGS | WP_DIA |
|------|-------|--------|
| 123  | 12    | 50     |
| 62   | 10    | 75     |
| 350  | 11    | 100    |

It is noted that replacing NULL values with mean values derived from a historical dataset and removing NULL rows within the dataset have been described for purposes of illustration, rather than by way of limitation and that machine learning engines operating in accordance with aspects of the present disclosure may utilize other techniques to "clean" datasets, as described in more detail below.

Figure 3:
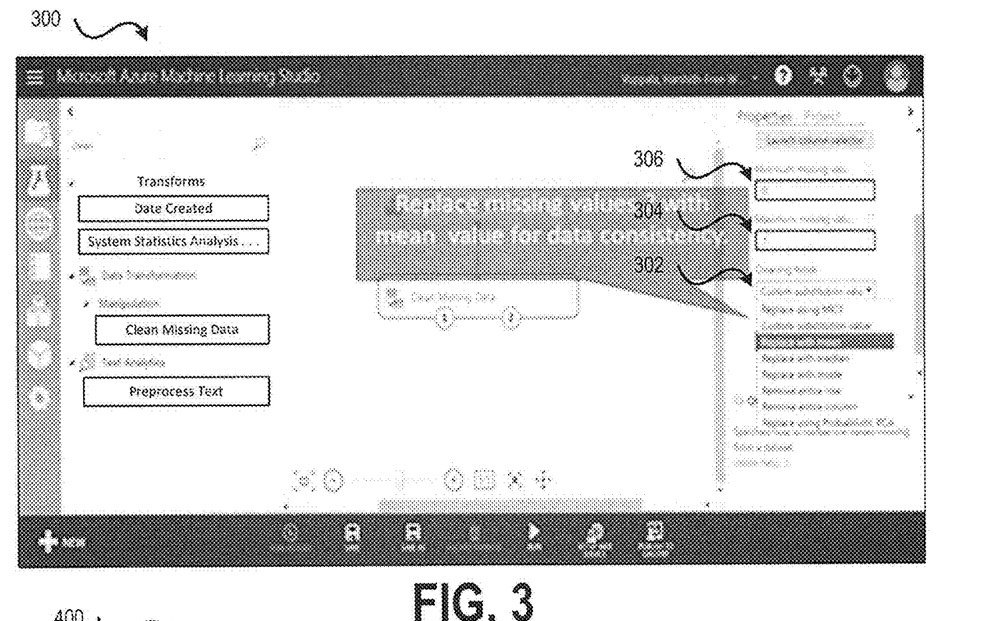
FIG. 3 is a screenshot of an exemplary user interface for configuring a dataset cleaning process in accordance with aspects of the present disclosure.

In an aspect, the monitoring sever 110 (or another server configured to perform the operations provided by the monitoring server 110) may provide one or more graphical user interfaces for configuring the cleaning process. For example and referring to FIG. 3, a screenshot of an exemplary user interface for configuring a dataset cleaning process in accordance with aspects of the present disclosure is shown as a user interface 300. As shown in FIG. 3, the user interface 300 may include a drop down menu 302 and input entry areas 304, 306 that enable a user to configured aspects of a cleaning process. The dropdown menu 302 may allow the user to specify how various data transformations are performed during the cleaning process. For example, the dropdown menu 302 may enable a user to specify how aspects of the dataset(s) are modified during the cleaning process, such as to replace values within the dataset(s) with mean values, media values, mode values, remove entire rows, remove entire columns, or other types of manipulations of the values included in the dataset(s). The input entry areas 304, 306 may allow the user to specify minimum criteria (e.g., minimum missing values) and maximum criteria (e.g., maximum missing values). The minimum and maximum criteria may be utilized to prevent outlier data from being introduced into the dataset(s) during the cleaning process. It is noted that the configuration functionality illustrated via the user interface 300 has been provided for purposes of illustration, rather than by way of limitation, and a user interface facilitating configuration of a cleaning process in accordance with aspects of the present disclosure may provide other functionality and options for controlling how datasets are cleaned depending on the particular configuration of the system.

Referring back to FIG. 1, the one or more monitoring engines 110 may be configured to collect and compile datasets according to a schedule. The datasets may be collected from the monitored system every 15 minutes or some other frequency of time, which may be configurable via the interface 300 of FIG. 3, for example. The collected dataset(s) may contain the information specified in Table 1 above, a subset of the information specified in Table 1, or other information depending on the particular configuration of the system 100. Once compiled, the dataset(s) may be cleaned and provided to the one or more machine learning engines for analysis. The one or more machine learning engines may be configured to utilize one or more machine learning algorithms to analyze the dataset in a predictive manner.

In an aspect, the machine learning engines may be configured to analyze the cleaned dataset using a random forest classifier to determine a system classification indicative of the health and performance of the monitored system. It is noted that random forest classifiers are described herein as being used by the machine learning modules for purposes of illustration, rather than by way of limitation and that other machine learning techniques and classifiers (e.g., a random forest classifier, a nearest neighbor classifier, a neural network classifier, and the like) may also be utilized with the systems and techniques disclosed herein. The random forest classifier of the machine learning engine(s) may be configured with n_estimators=1000 and max_depth=10, which testing has shown to provide a prediction accuracy of 99.25%-however, it is noted that random forest classifiers having a different number of estimators and/or a different depth parameter value may also be used at the expense of additional computational complexity (e.g., if more estimators and/or a larger depth value are used) or degraded prediction accuracy (e.g., if less estimators and/or a smaller depth value are used). For example, Table 2 below illustrates different prediction accuracies corresponding to different configurations of a random forest classifier.

TABLE 2

| Prediction Accuracy | n_estimators | max_depth |
|---|---|---|
| 95.77% | 500 | 4 |
| 96.52% | 500 | 5 |
| 97.68% | 200 | 6 |
| 98.07% | 1000 | 6 |
| 98.10% | 750 | 6 |
| 98.13% | 500 | 6 |
| 98.32% | 600 | 7 |
| 98.66% | 200 | 8 |
| 98.99% | 200 | 10 |
| 99.05% | 500 | 10 |

To generate the system classification output, the historic dataset may be split into a training dataset and a test dataset and used to train a model using the random forest classifier. In an aspect, the historic dataset may be compressed. For example, the historic dataset may be limited to a particular number of consecutively datasets, such as 4 datasets. It is noted that 4 datasets is described for purposes of illustration and the particular number of datasets may be less than 4 or more than 4 datasets depending on the configuration of the system 100. Further, it is noted that the compressed dataset may include consecutively collected datasets (e.g., if no NULL rows are received during the compiling of the datasets) or may include datasets collected in a non-consecutive manner (e.g., if any rows of a compiled dataset were removed, as described above). An exemplary algorithm for splitting the dataset into the training dataset and the test dataset is provided below:

```
X_train, X_test, y_train, y_test = train_test_split(X, y, test_size=.30,
    random_state=42)
clf.fit(X_train, y_train)
```

In the exemplary algorithm illustrated above, the size of the testing dataset is configured to be 30% of the historic data (e.g., historic performance metric data stored in one or more databases). Once the dataset has been split into the testing dataset and the training dataset, a model may be trained using the random forest classifier. An exemplary algorithm for training the model using the training dataset and the random forest classifier is shown below:

```
clf = RandomForestClassifier(n_estimators=1000, max_depth=10
    ,random_state=0)
clf.fit(X_train, y_train)
```

In the example above, X_train indicates the input features and Y_train indicates the output variable of the training dataset, which may be obtained during the splitting of the dataset into the test and training datasets.

Once the model has been trained, the trained model may be scored based on the testing data. In an aspect, the scoring of the model based on the testing data may be performed using a confusion matrix. The confusion matrix may be configured to evaluate the performance of the trained model (e.g., accuracy of predictions) and in turn, the random forest classifier that was used to train the model. An exemplary algorithm for scoring the model using a confusion matrix is provided below:

```
#score the testing data
score = clf.score(X_test, y_test)
y_pred = (clf.predict (X_test))
```

```
#evaluate using Confusion Matrix
cm = confusion_matrix(y_test, y_pred)
```

```
stats = pd.read_csv ("System_statistics_new.csv")
for i in range(0,len(stats)-4):
    subdf = stats.iloc[i:i+4]
    X = subdf[["MEM_UTIL","SM12","TLOGS","WP_BGD","WP_DIA","WP_UPD","HURT",
        "NRIV_lockwait","Update_status","NRBUFFER"]].values
    tf = np.array(pca.fit_transform(X))
    fet.append(tf.flatten( ))
    Y = subdf["System_down"].values
    lable.append((Y[3]))
```

The model scoring and evaluation process may generate one or more outputs that indicate an accuracy of predictions derived from the trained model based on the testing dataset. An exemplary confusion matrix output is provided below:

$$\begin{bmatrix} 4368 & 27 \\ 45 & 5174 \end{bmatrix},$$

where the value "4368" represents the true positive predictions observed from the evaluation of the testing dataset using the trained model, the value "27" represents the false negative predictions observed from the evaluation of the testing dataset using the trained model, the value "45" represents the number of false positive predictions observed from the evaluation of the testing dataset using the trained model, and the value "5174" represents the true negative predictions observed from the evaluation of the testing dataset using the trained model. For the exemplary output illustrated above, the score output for the trained model may indicate the trained model has an prediction accuracy of 99% (e.g., 0.9925109215727065). The accuracy prediction may be calculated based on the total number of correct predictions (e.g., true positives and true negatives) relative to the total number of predictions (e.g., true positives (4368)+true negatives (5174)/(true positives (4638)+false negatives (27)+true negatives (5174)+false positives (45)), or 9542/9614=0.9925109215727065).

Once the model has been trained using the random forest classifier (or another types of classifier or combination of classifiers and other techniques) and determined to provide a threshold level of prediction accuracy (e.g., 99%, 99.2%, 99.4%, or some other threshold level of accuracy), the model may be saved for future use by the one or more machine learning engines to evaluate the state of a monitored system, such as the operations system 140. To illustrate, the one or more monitoring engines of the monitoring server 110 may periodically retrieve performance metrics data and provide a portion of the collected performance metrics to a machine learning engine associated with a model that has been trained to a desired level of accuracy, as described above.

The dataset used to generate the system classification output may include multiple performance metric datasets collected over a period of time. For example, the dataset used to generate the system classification output may include a plurality of datasets collected by the monitoring engine(s) over a period of time, such as 4 consecutive datasets collected over the past 1 hour. An exemplary algorithm that may be used by a machine learning engine to aggregate the dataset used to generate the system classification output from multiple sets of performance metrics is provided below:

The exemplary algorithm illustrated above is configured to aggregate a collection of 4 consecutive datasets (e.g., 4 performance datasets collected by the monitoring server 110 over the past 1 hour at 15 minute time intervals). The aggregate dataset may be evaluated against the trained model and a system classification output may be generated. In an aspect, the system classification output by the machine learning engine may be a binary value (e.g., a value of "1" may indicate the monitored system is predicted to experience a failure and a value of "0" may indicate the monitored system is not predicted to experience a failure). It is noted that the binary system classification output described above has been provided for purposes of illustration, rather than by way of limitation and that other types of system classification outputs may be generated depending on how the system 100 is configured.

The system classification output may be provided to a user, such as an operator of the electronic device 130. For example, as shown in FIG. 1, a notification may be provided from the monitoring server 110 to the electronic device 130. The notification may include information that indicates the system classification output derived by the machine learning engine, such as to notify the operator of the electronic device 130 that the operations server 140 is, or is not, predicted to experience a failure. In an aspect, the notification may be a text message, a short messaging service message, a multimedia messaging service message, an e-mail, an automated voice response message, or some other type of message configured to convey information associated with the system classification output to the operator of the electronic device 130.

Figure 4:
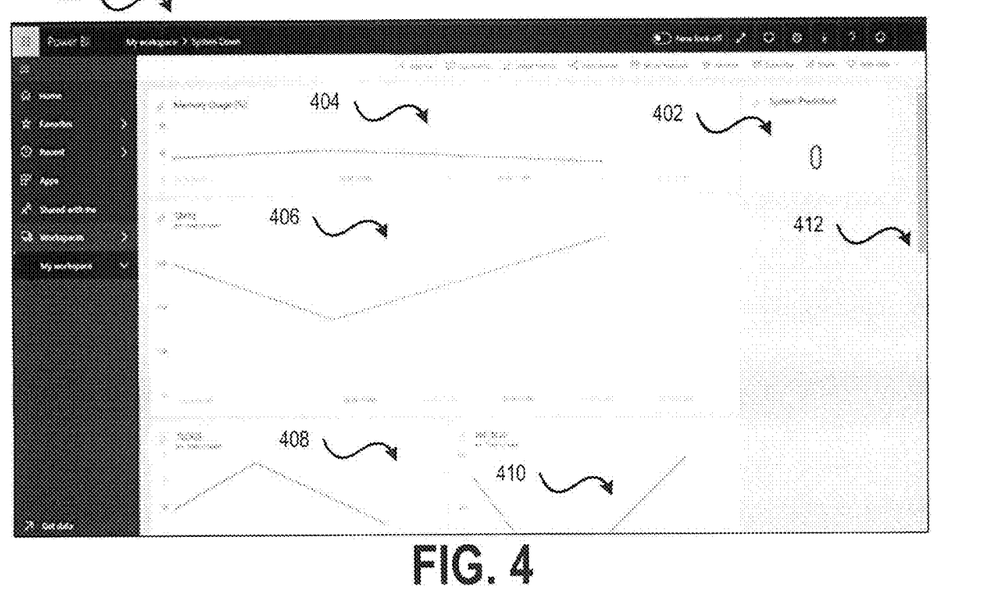
FIG. 4 is a screenshot of an exemplary graphical user interface for displaying information associated with system classification outputs in accordance with aspects of the present disclosure.

As an example and referring to FIG. 4, a screenshot of an exemplary graphical user interface for displaying information associated with system classification outputs in accordance with aspects of the present disclosure is shown as a user interface 400. As shown in FIG. 4, the user interface 400 includes the system classification output area 402, which may be configured to display a current value for the system classification output of the monitored system (e.g., a predicted operational status of the operations server 140 of FIG. 1). The system classification output area 402 may provide the viewer with a quick reference for gauging the current state of the monitored system. In addition, the user interface 400 may provide information associated with other performance metrics of the monitored system. For example, a memory usage area 404 may be provided that indicates trends regarding memory utilization of the monitored system over a period of time, a number of locks area 406 may be provided that indicates trends regarding memory utilization of the monitored system over the period of time, a transaction logs area 408 may be provided that indicates trends regarding transaction log usage of the monitored system over the period of time, and a background processes area 410 may be provided that indicates trends regarding a number of background workprocesses associated with the monitored system over the period of time. It is noted that the user interface 400 may be configured to present additional performance information associated with the monitored system, which may be viewed using scrollbar 412. Further, it is noted that the exemplary performance metrics illustrates in FIG. 4 have been provided for purposes of illustration, rather than by way of limitation and user interfaces according to the present disclosure may be configured to present the information described above in a different manner or order, as well as present other types of information or less information that is depicted in FIG. 4.

Referring back to FIG. 1, it is noted that the system 100 may be configured to provide information regarding the system classification output to relevant users in other ways than transmitting the notification described above. For example, the monitoring server 110 may be configured record the system classification outputs in a database (e.g., the one or more databases 224 of FIG. 2 or the one or more databases 148 of FIG. 1 in embodiments where the functions of the monitoring server 110 are integrated with the operations server 140) and the user may access the system classification outputs and other relevant information via an application (e.g., a browser-based application providing access to the system classification output and performance trend information via a web browser; a standalone application, widget, or other software executing on a desktop or laptop computing device; a mobile application executing on a smartphone or other mobile computing device; and the like). In some aspects, the notification regarding the system classification output may only be transmitted when a system failure is predicted.

In an aspect, graphical user interfaces providing users with access to the system classification output and other relevant performance metrics trends may be configured to provide recommendations regarding actions that may be taken to mitigate an occurrence of a predicted system failure as well as tools to implement operations configured to mitigate the occurrence of a predicted system failure. Illustrative operations that may be performed (via the provided tools) to mitigate predicted system failures are described in the described herein (e.g., in the examples below). In addition to providing recommendations and tools for taking action to mitigate the occurrence of a predicted system failure, systems configured in accordance with aspects of the present disclosure may be configured to automatically execute operations to mitigate the occurrence of a predicted system failure. For example, where a system failure is predicted based on a set of KPIs that includes negative trends associated with a lock wait metric (e.g., a Lock wait BOT in an SAP system), the system may automatically remove one or more of the locks contributing to that KPI. Automatically performing such actions may eliminate the impact of the corresponding KPIs on overall system health and performance and reduce the likelihood that a system failure occurs. In an aspect, the system may automatically perform any available mitigation operations associated with KPIs negatively impacting system performance and then monitor the impact that those remediation operations have on the predicted system performance over a next time interval (e.g., a next 15 minutes, a next 30 minutes, a next hour, etc.) to determine whether the automatic mitigation operations were successful (e.g., the system classification output indicates no predicted system failure). If the system is still predicted to experience a failure (e.g., after mitigating the impact of the KPIs associated with the automatically executed mitigation procedures), the user may then be notified of the degrading system performance. In still another additional or alternative aspect, the system may automatically execute available mitigation procedures and also notify the user of the degrading system performance without waiting to see how the automatically executed mitigation procedures have on predicted system performance. Exemplary scenarios illustrating operations for providing automatic mitigation of system failures are described below.

In a first exemplary scenario, suppose that a system failure is predicted based on multiple performance metrics trends and one of the performance metric trends is related to a high number of lock entries. As described above, a high number of lock entries (e.g., the variable SM12) may indicate that the oldest lock object is not being released on a specific table and other processes accessing the same table are waiting for the lock entry to be released, which may leads to a deadlock situation and negatively affects the system. In such scenario, the lock entry or entries which are causing other process to wait may be unlocked or the root process which is holding the lock entry may be killed to ensure system performance is restored to a normal state.

In another exemplary scenario, suppose that a system failure is predicted based on multiple performance metrics trends and one of the performance metric trends is related to the update service status and indicates the service is in inactive state, meaning that update processes in the system are halted. To mitigate the impact of the update service status, the tablespace size may be increased (e.g., before the update service status goes to inactive).

In yet another exemplary scenario, suppose that a system failure is predicted based on multiple performance metrics trends and one of the performance metric trends is related to the number range buffer. If the number range interval expected is not in the buffer or the number stock is exhausted, the number range buffer must fetch new numbers from table NRIV in the database. When numbers from table NRIV cannot be fetched from the database, an auto remediation program may be initiated to reset the specific number range object, thus preventing the system performance degradation or degraded end-user experience caused by issued related to the number range buffer.

In yet another exemplary scenario, suppose that a system failure is predicted based on multiple performance metrics trends and one of the performance metric trends is related to high update response times, which relates to the time taken by update workprocess to update changes at the database. When the HURT variable exceeds a threshold (e.g., 1000 ms), an auto remediation program may be initiated to identify the update which is causing the issue and cancel it (including notification and obtaining proper approvals from the owner of the program if required by system specifications), thereby allowing high update response times to return to a normal level.

In yet another exemplary scenario, suppose that a system failure is predicted based on multiple performance metrics trends and one of the performance metric trends is related to dialog workprocess utilization, which may indicate whether end-user experience is likely to experience slowness in the system and may prevent end-users from accessing the system (e.g., if all the dialog workprocess are occupied). When such a trend is predicted, the user occupying a greater number of workprocess may be identified and one or more of the workprocesses may be killed. As another example, the user that is using the most system memory may be identified and the user's session may be ended (following notification to the offending end user). Such processes may include a batch job that is triggering many parallel dialog work processes, which consume high amounts of memory and processor resources. It is noted that the exemplary automatic system failure mitigation processes described in the exemplary scenarios above have been provided for purposes of illustration, rather than by way of limitation and systems configured in accordance with aspects of the present disclosure may be configured to perform additional mitigation processes associated with other issues identified with respect to the monitored system(s).

Figure 5:
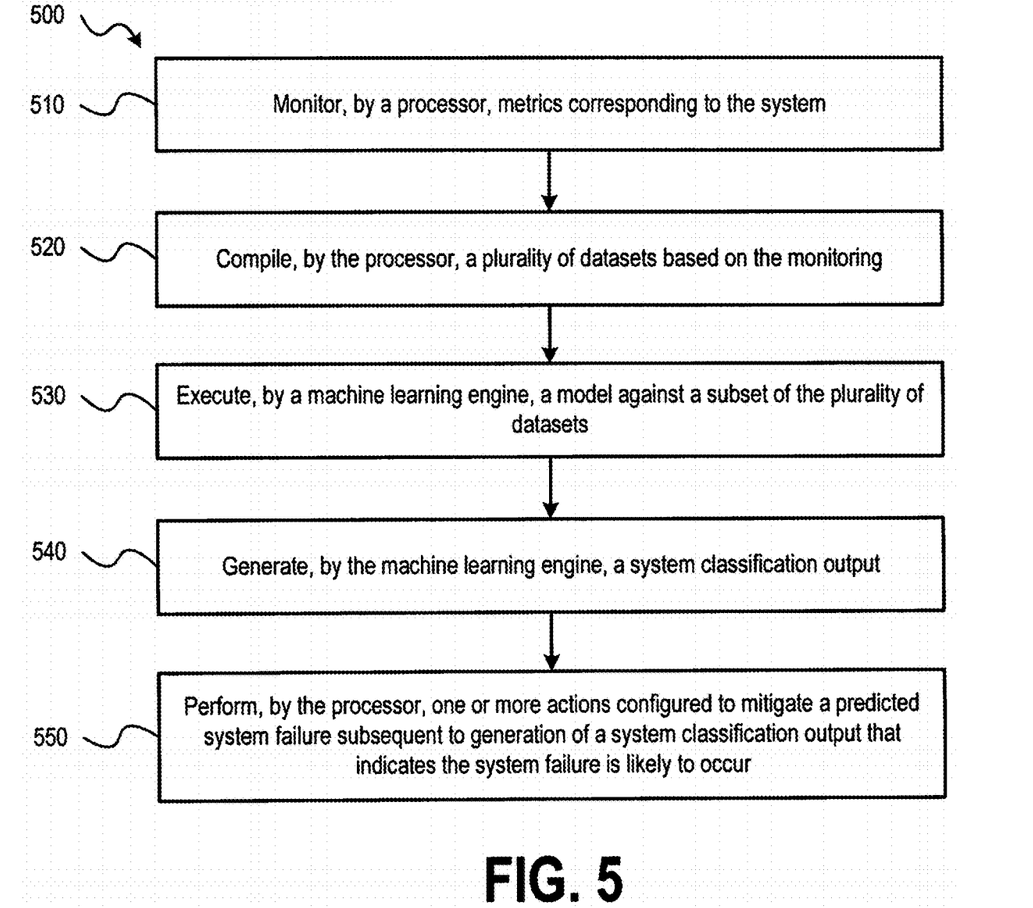
FIG. 5 is a flow diagram of an exemplary method for improving system uptime and availability in accordance with aspects of the present disclosure.

Referring to FIG. 5, a flow diagram of an exemplary method for improving system uptime and availability in accordance with aspects of the present disclosure is shown as a method 500. In an aspect, steps of the method 500 may be stored as instructions (e.g., the instructions 222 of FIG. 2 or the instructions 146 of FIG. 1) that, when executed by one or more processors (e.g., the one or more processors 210 of FIG. 2 or the one or more processors 142 of FIG. 1), cause the one or more processors to perform operations for improving system uptime and availability according to aspects of the present disclosure. Operations of the method 500 may be utilized to predict future failures of a system (e.g., the operations server 140 of FIG. 1) before the failures occur and to initiate operations to mitigate the failures before system performance degrades to the point of failure. The operations of the method 500 may improve overall performance of the monitored systems by: increasing system uptimes (i.e., availability), helping systems administrators maintain the monitored systems in a healthy state, ensuring the functionality those systems provide is readily available to system users, and other advantages.

At step 510, the method 500 includes monitoring, by a processor, metrics corresponding to the system. As described above with reference to FIGS. 1 and 2, the metrics may include information associated with performance of the monitored system, such as memory utilization, system locks, system updates, background processes, and the like. The method 500 includes, at step 520, compiling, by the processor, a plurality of datasets based on the monitoring. Each dataset of the plurality of datasets may include metrics associated with a different period of time. For example, as described above, performance metrics may be obtained according to scheduling information that specifies the types of performance metrics to be monitored and a time interval for obtaining updated information regarding the performance metrics. In an aspect, the method 500 may include cleaning information included in at least one dataset of the plurality of datasets. For example, as described above with reference to FIGS. 1 and 2, the cleaning may include replacing one or more values included in the at least one dataset with one or more values derived from a historical dataset, removing a portion of the at least one dataset, or other operations described herein.

At step 530, the method 500 includes executing, by a machine learning engine, a model against a subset of the plurality of datasets. The execution of the model against the subset of the plurality of datasets may be configured to evaluate trends associated with combinations of metrics within the subset of the plurality of datasets to predict a likelihood of a future system failure. For example, as described herein, performance metrics individually may not provide information that indicates a system failure is likely to occur in the future, but the machine learning engine may be configured to interpret how trends in the performance metrics may interact to impact system performance, which provides insights into future system performance and enables system failures to be identified before they occur. As described above with reference to FIGS. 1 and 2, the model(s) used by the machine learning engine may be trained using a machine learning classifier (e.g., a random forest classifier, a nearest neighbor classifier, and a neural network classifier) and a training dataset derived from at least a portion of the historical dataset. Prior to utilizing the trained model to predict system failures, a score for the (trained) model may be determined and the score may indicate an accuracy of the trained model. If the accuracy of the trained model satisfies a threshold level of accuracy, the machine learning engine may be configured to utilize the trained model for predicting system failures (e.g., at step 530).

As a result of the execution of the trained model against the subset of the plurality of datasets, the method 500 may include, at step 540, generating a system classification output. The system classification output may include information representative of whether a future system failure is predicted to occur and may be based on the evaluated trends associated with the one or more combinations of metrics within the subset of the plurality of datasets, as described above. Subsequent to generation of a system classification output that indicates the system failure is likely to occur, the method 500 includes, at step 550, performing, by the processor, one or more actions configured to mitigate a predicted system failure. In an aspect, the method 500 may include presenting the system classification output at a user interface, such as the user interface 400 of FIG. 4. In addition to displaying the system classification output, the user interface may provide one or more interactive tools associated with the one or more actions to mitigate the predicted system failure. An input corresponding to user interaction with at least one interactive tool of the one or more interactive tools may be received via the user interface and the performance of at least one action may be initiated based on the interaction with the at least one interactive tool. Additionally or alternatively, at least one action of the one or more actions is performed automatically subsequent to the generation of the system classification output that indicates the system failure is likely to occur. It is noted that the user interface may be configured to present other information, such as information related to at least one performance metric trend determined by the machine learning engine.

As illustrated herein, the method 500 provides significant improvements over prior system health monitoring techniques and tools. For example, previous techniques and tools utilized for system health monitoring were reactionary, meaning that a failure would occur and then a user would be notified and react to the failure. In contrast, the method 500 enables failures to be detected before they occur, which allows operations to mitigate the occurrence of the predicted failure to be taken before it actually occurs. This ensures that the system does not actually experience a failure and improves overall performance of monitored systems by increasing system uptimes (i.e., availability). Additionally, the method 500 provides an interactive user interface that provides tools and information to help systems administrators maintain the monitored system(s) in a healthy state and ensure the functionality provided by the monitored system(s) is readily available to system users.

Example

Monitoring of an SAP-based system was performed and performance metrics associated with particular KPIs were obtained, as described above. In this example, the performance metrics obtained during the monitoring included: KPI 1: SAP Number Range Buffer objects in error; KPI 2: SAP Lock waits on NRIV table; KPI 3: SAP no free update work processes; and KPI 4: Piling up of DB updates. The performance metrics were provided to a machine learning engine for analysis as described above and the machine learning engine generated a system classification output that predicted the monitored system performance would degrade over the next 2-3 hours, eventually leading to the system entering a deadlock state. It is noted that the performance metrics also included additional KPIs, but the specific combination of KPIs discussed in Example 1 were the primary basis for the prediction that the system performance was degrading. For example, the model used to generate the system classification output analyzed the relevant performance metrics against the training data and the trends for the above-identified KPIs were found to historically predict a system performance degradation (e.g., in 2-3 hours).

As described above, the system classification output was presented to a user (e.g., via the user interface 400 of FIG. 4 or another type of notification/interface). Based on the system classification output and trend information associated with the relevant KPIs, it was discovered that there was a pile up of certain system failed upgrades, lock waits, and the number range buffer was full. After investigating these issues, the user discovered that some of the upgrade work processes were in a hung state, but at this point the system had enough resources to operate in a healthy manner. Thus, KPI 2 alone was not indicating a system failure. During the analysis of the system, the user found that the trend indicative of degrading system performance indicated by the combination of KPIs discussed in this example were caused by a long running job initiated by another user (e.g., one of the user devices 130 of FIG. 1) that was slowly locking the system resources. To mitigate the occurrence of a system failure, a message was generated and sent to the owner of the job. The message indicated that the job was being canceled in a manner configured to avoid data losses. In an alternative example, the offending job may be automatically canceled without user intervention. Once the job was canceled, system performance improved and the prediction of a system performance degradation indicated by the system classification output changed to indicate the system was predicted to not experience a failure in the near future.

As shown in Example 1 above, the predictive nature of the machine learning and modelling techniques disclosed herein enable patterns to be identified from the combined effect that multiple KPIs, as well as other environmental factors (e.g., jobs, events, and activities being performed on behalf of users of the monitored system), have on the system during a period of time, and demonstrate how taking the combined effect into consideration provides a predictive approach to system health monitoring, where system failures are predicted and mitigated prior to actual system crashes and performance degradations being realized. Such capabilities also enable problems to be mitigated in a manner that improves system uptimes and availability. For example, due to their reactionary nature, previous approaches for performing health monitoring of a system often require system restarts. Such restarts require the system to be taken offline and preventing users from accessing the services and information provided by the system until the restart process is complete.

Experiments have shown that the techniques described above can improve system uptimes, even where prior approaches provided reasonable system uptimes. For example, a system that capable of realizing uptimes of 98.1%, 98.76%, and 99.1% may be improved to 99.9% system uptime using the techniques disclosed herein. It is noted that while an improvement of 0.8% (e.g., from 99.1% to 99.9%) may seem trivial, service level agreements utilized in such systems often guarantee 99.9% availability and failure to satisfy such provisions often specify conditions that negatively impact the operator of the system if the specified uptime is not achieved. Utilizing the techniques disclosed herein, such provisions may be readily achieved, which benefits both the operator of the system (e.g., by avoiding the impact of any provisions for failing to achieve the 99.9% uptime guarantee) and the users (e.g., by providing almost continuous access to the system and the services the system provides to the users). Additionally, where the system provides critical services, such as emergency responses systems or systems controlling complex manufacturing processes, the ability to improve system availability may provide significant benefits.

Although the embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:
1. A method comprising:
monitoring, by a processor, computing resources of a system, the computing resources comprising hardware resources, communication resources, software resources, or a combination thereof;
obtaining, by the processor, metrics corresponding to a plurality of metrics associated with a system based on the monitoring, wherein the plurality of metrics comprise metrics corresponding to the computing resources of the system and include at least metrics selected from the group consisting of: a lock metric, a transaction log metric, a background processes metric, a dialog processes metric, an update processes metric, an update response time metric, or a combination thereof;
compiling, by the processor, a plurality of datasets based on the monitoring, wherein the plurality of datasets includes at least a first dataset and a second dataset, wherein the first dataset comprises first values for a first set of metrics obtained via the monitoring during a first period of time and the second dataset comprises second values for the first set of metrics obtained via the monitoring during a second period of time, wherein the first period of time and the second period of time are consecutive periods of time;
cleaning information included in the plurality of datasets, wherein the cleaning is configured to address errors in the plurality of datasets;

evaluating, by a machine learning engine, the first dataset and the second dataset using a machine learning model configured to:
  determine a trend associated with the first set of metrics based on the first values and the second values, wherein the trend corresponds to a trend determined based on changes in the lock metric and the transaction log metric, changes in the background processes metric and the dialog processes metric, changes in the update processes metric and the lock metric, changes in the update processes metric and the transaction log metric, changes in the update processes metric and the update response time metric, or a combination thereof; and
  predict a likelihood of a future system failure based on the trend determined based on the first values and the second values, wherein the machine learning engine subsequently determines a second trend associated with the first set of metrics based on evaluation of the second values of the second data and a third dataset of the plurality of datasets using the machine learning model, wherein the third dataset comprises third values for the first set of metrics obtained via the monitoring during a third period of time, wherein the second period of time and the third period of time are consecutive periods of time, wherein the first dataset is omitted from the subsequent determination using the machine learning model;
generating, by the machine learning engine, a system classification output comprising information representative of whether a future system failure is predicted based on one or more trends identified by the machine learning engine using the machine learning model; and
performing, by the processor, one or more actions to mitigate a system failure predicted by the system classification output.

2. The method of claim 1, further comprising training the machine learning model based on a machine learning classifier and a training dataset prior to evaluating datasets of the plurality of datasets using the machine learning model, the training dataset derived from at least a portion of a historical dataset.

3. The method of claim 2, wherein the machine learning classifier comprises a random forest classifier, a nearest neighbor classifier, or a neural network classifier.

4. The method of claim 2, further comprising:
  determining a score for the machine learning model subsequent to training the machine learning model based on the machine learning classifier and the training dataset, the score configured to evaluate an accuracy of the trained machine learning model; and
  configuring the machine learning engine to generate system classification outputs using the trained machine learning model when the score satisfies a threshold accuracy level.

5. The method of claim 1, wherein the cleaning comprises replacing one or more values included in the plurality of datasets with one or more values derived from a historical dataset.

6. The method of claim 1, wherein the cleaning comprises:
  removing a portion of the plurality of datasets.

7. The method of claim 1, further comprising:
  presenting the system classification output at a user interface, the user interface comprising one or more interactive tools associated with the one or more actions to mitigate the predicted future system failure; and
  receiving, via the user interface, an input corresponding to user interaction with at least one interactive tool of the one or more interactive tools, wherein the input is configured to initiate performance of at least one action corresponding to the at least one interactive tool.

8. The method of claim 7, further comprising presenting at least one performance metric trend at the user interface.

9. The method of claim 1, wherein at least one action of the one or more actions is performed automatically subsequent to the generation of the system classification output that indicates the future system failure is likely to occur.

10. A non-transitory computer-readable storage medium storing instructions that, when executed by one or more processors, cause the one or more processors to perform operations for improving system uptime, the operations comprising:
  monitoring computing resources of a system, the computing resources comprising hardware resources, communication resources, software resources, or a combination thereof;
  obtaining, by the processor, metrics corresponding to a plurality of metrics associated with a system based on the monitoring, wherein the plurality of metrics comprise metrics corresponding to the computing resources of the system and include at least metrics selected from the group consisting of: a lock metric, a transaction log metric, a background processes metric, a dialog processes metric, an update processes metric, an update response time metric, or a combination thereof;
  compiling a plurality of datasets based on the monitoring, wherein the plurality of datasets includes at least a first dataset and a second dataset, wherein the first dataset comprises first values for a first set of metrics obtained via the monitoring during a first period of time and the second dataset comprises second values for the first set of metrics obtained via the monitoring during a second period of time, wherein the first period of time and the second period of time are consecutive periods of time;
  cleaning information included in the plurality of datasets, wherein the cleaning is configured to address errors in the plurality of datasets;
  evaluating the first dataset and the second dataset using a machine learning model configured to:
  determine a trend associated with the first set of metrics based on the first values and the second values, wherein the trend corresponds to a trend determined based on changes in the lock metric and the transaction log metric, changes in the background processes metric and the dialog processes metric, changes in the update processes metric and the lock metric, changes in the update processes metric and the transaction log metric, changes in the update processes metric and the update response time metric, or a combination thereof; and
  predict a likelihood of a future system failure based on one or more of the trend determined based on the first values and the second values, wherein the machine learning model subsequently determines a second trend associated with the first set of metrics based on the second values of the second data and a third dataset of the plurality of datasets using the machine learning model, wherein the third dataset comprises third values for the first set of metrics obtained via the monitoring during a third period of time, wherein the second period of time and the third period of time are consecutive periods of time, and wherein the first dataset is omitted from the subsequent determination using the machine learning model;

generating a system classification output via a machine learning engine, the system classification output comprising information representative of whether a future system failure is predicted based on the one or more trends identified by the machine learning engine using the machine learning model; and performing one or more actions to mitigate a system failure predicted by the system classification output.

11. The non-transitory computer-readable storage medium of claim 10, the operations further comprising training the machine learning model based on a machine learning classifier and a training dataset prior to evaluating datasets of the plurality of datasets using the machine learning model, the training dataset derived from at least a portion of a historical dataset.

12. The non-transitory computer-readable storage medium of claim 11, wherein the machine learning classifier comprises a random forest classifier, a nearest neighbor classifier, or a neural network classifier.

13. The non-transitory computer-readable storage medium of claim 11, further comprising:
determining a score for the machine learning model subsequent to training the machine learning model based on the machine learning classifier and the training dataset, the score configured to evaluate an accuracy of the trained machine learning model; and
configuring the machine learning engine to generate system classification outputs using the trained machine learning model when the score satisfies a threshold accuracy level.

14. The non-transitory computer-readable storage medium of claim 10, wherein the cleaning comprises replacing one or more values included in the plurality of datasets with one or more values derived from a historical dataset.

15. The non-transitory computer-readable storage medium of claim 14, wherein the cleaning comprises:
removing a portion of the plurality of datasets.

16. The non-transitory computer-readable storage medium of claim 10, further comprising:
presenting the system classification output at a user interface, the user interface comprising one or more interactive tools associated with the one or more actions to mitigate the predicted future system failure; and
receiving, via the user interface, an input corresponding to user interaction with at least one interactive tool of the one or more interactive tools, wherein the input is configured to initiate performance of at least one action corresponding to the at least one interactive tool.

17. The non-transitory computer-readable storage medium of claim 16, further comprising presenting at least one performance metric trend at the user interface.

18. The non-transitory computer-readable storage medium of claim 10, wherein at least one action of the one or more actions is performed automatically subsequent to the generation of the system classification output that indicates the future system failure is likely to occur.

19. A system comprising:
a memory;
one or more processors configured to:
monitor computing resources of a system, the computing resources comprising hardware resources, communication resources, software resources, or a combination thereof;
obtain metrics corresponding to a plurality of metrics associated with a system based on the monitoring, wherein the plurality of metrics comprise metrics corresponding to the computing resources of the system and include at least metrics selected from the group consisting of: a lock metric, a transaction log metric, a background processes metric, a dialog processes metric, an update processes metric, an update response time metric, or a combination thereof;
compile a plurality of datasets based on the monitoring, wherein the plurality of datasets includes at least a first dataset and a second dataset, wherein the first dataset comprises first values for a first set of metrics obtained via the monitoring during a first period of time and the second dataset comprises second values for the first set of metrics obtained via the monitoring during a second period of time, wherein the first period of time and the second period of time are consecutive periods of time; and
clean information included in the plurality of datasets, wherein the cleaning is configured to address errors in the plurality of datasets;
one or more service modules executable by the one or more processors and configured to provide functionality to one or more external user devices; and
a machine learning engine executable by the one or more processors, the machine learning engine configured to:
evaluate the first dataset and the second dataset using a machine learning model configured to:
determine a trend associated with the first set of metrics based on the first values and the second values, wherein the trend corresponds to a trend determined based on changes in the lock metric and the transaction log metric, changes in the background processes metric and the dialog processes metric, changes in the update processes metric and the lock metric, changes in the update processes metric and the transaction log metric, changes in the update processes metric and the update response time metric, or a combination thereof; and
predict a likelihood of a future system failure based on the trend determined based on the first values and the second values wherein the machine learning engine subsequently determines a second trend associated with the first set of metrics based on evaluation of the second values of the second data and a third dataset of the plurality of datasets using the machine learning model, wherein the third dataset comprises third values for the first set of metrics obtained via the monitoring during a third period of time, wherein the second period of time and the third period of time are consecutive periods of time, and wherein the first dataset is omitted from the subsequent determination using the machine learning model; and
generate a system classification output information representative of whether a future system failure is predicted based on the one or more trends identified by the machine learning engine using the machine learning model; and
wherein the one or more processors are configured to perform one or more actions to mitigate a system failure predicted by the system classification output.

20. The system of claim 19, wherein the machine learning engine is configured to:
train the machine learning model based on a machine learning classifier and a training dataset prior to evaluating datasets of the plurality of datasets using the machine learning model, the training dataset derived from at least a portion of a historical dataset;

determine a score for the machine learning model subsequent to training the machine learning model based on the machine learning classifier and the training dataset, the score configured to evaluate an accuracy of the trained machine learning model;

wherein the one or more processors are configured to:
present the system classification output at a user interface comprising one or more interactive tools associated with the one or more actions to mitigate predicted system failures; and
automatically perform at least one action of the one or more actions subsequent to the generation of the system classification output that indicates the system failure is likely to occur.

* * * * *

UNITED STATES PATENT AND TRADEMARK OFFICE
CERTIFICATE OF CORRECTION

PATENT NO. : 11,921,573 B2
APPLICATION NO. : 16/700316
DATED : March 5, 2024
INVENTOR(S) : Badrinarayanan Damal Vijayaraghavan et al.

It is certified that error appears in the above-identified patent and that said Letters Patent is hereby corrected as shown below:

In the Specification

At Column 5, Line number 11, delete "The/O devices" and replace with --The I/O devices--.

Signed and Sealed this
Sixteenth Day of April, 2024

Katherine Kelly Vidal
*Director of the United States Patent and Trademark Office*